Sept. 8, 1964  J. P. MESSLER  3,147,564
FISH LURE
Filed Aug. 26, 1963
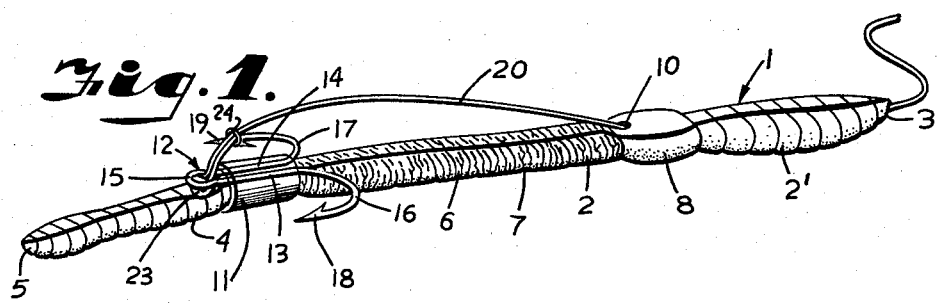
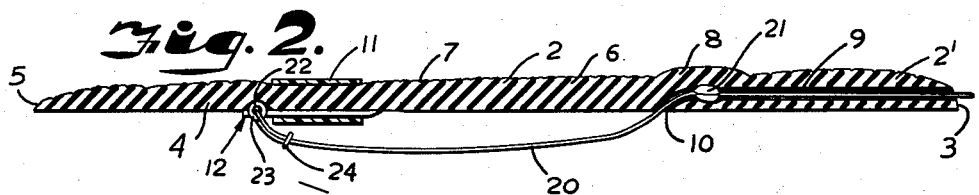
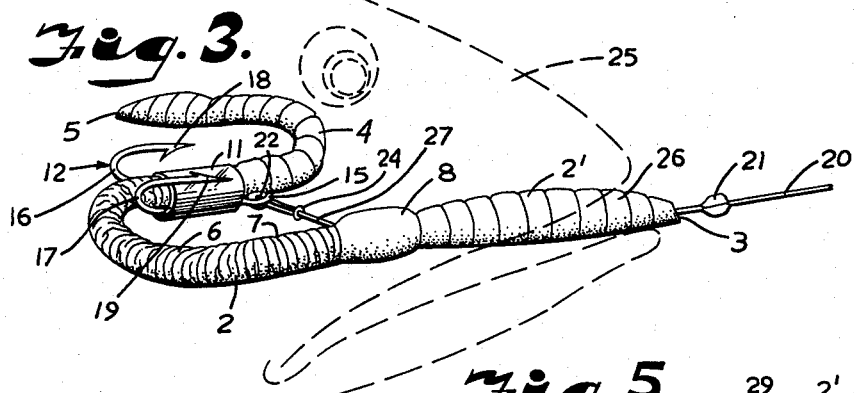
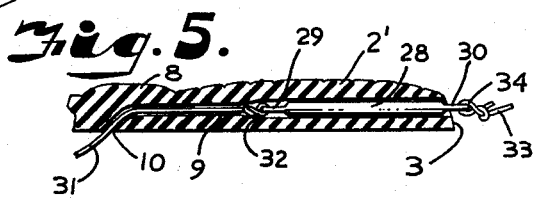
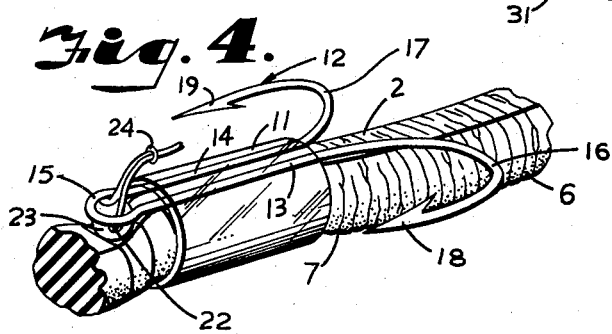
INVENTOR.
JOSEPH P. MESSLER
BY
Fishburn & Gold
ATTORNEYS

3,147,564
FISH LURE
Joseph P. Messler, 4410 E. 46th Place, Tulsa, Okla.
Filed Aug. 26, 1963, Ser. No. 304,417
6 Claims. (Cl. 43—35)

This invention relates to a fishing lure, and more particularly to an artificial bait which is snag resistant and tends to prevent pick up of weeds and other debris in lakes and rivers. The present application is a continuation-in-part of my application Serial No. 213,239, filed July 30, 1962, now Patent No. 3,120,074.

The principal object of the present invention is to provide a fishing lure having a flexible body simulating a worm having a hook mechanism secured thereto and slidable thereon wherein the point of the hook mechanism is facing in the opposite direction to which the lure is being drawn and upon being taken in the mouth of a fish pull on the line will cause the hook to reverse its position and the point to engage in the fish's mouth so that the fish may be drawn out of the water.

Other objects of the present invention are to provide a flexible body for the lure having a forward portion, an intermediate portion and a rear portion, forward portion being provided with an elongated passageway or opening extending therethrough; to provide said passageway opening with a reduced opening at the rear of said forward portion of the body of the lure; to provide a sleeve or cylindrical member adapted to engage over and be movable on the rear portion of the body of the lure; to provide a hook mechanism having a shank portion extending through said cylindrical member and having an eye on one end extending in normal position toward the rear end of the body and having a hook portion extending out of the other end of the cylindrical member and the point of the hook also turned to the rear of the body member when in normal position; to provide means for securing a line to the eye portion of the hook mechanism and said line extending alongside said intermediate portion of the body of the lure and through the passageway or opening and outwardly of the forward end of the body; to provide a weight member on said line and movable in said opening.

Other objects of the present invention are to provide an elongated weight member movable in the passageway in the forward portion of the body having eyes on each end; to provide a first line attached to the forward end of said weight and a shorter line attached to the rear portion of the weight and extending rearwardly alongside the body of the lure to the eye of the hook member and secured thereto by means of an anchor in the form of a ball; to provide such a structure wherein the ball is held in place by the line passing through the eye of the hook member and the ball is larger than the opening in said eye and rests between the hook member and the body of the lure.

Still further objects of the invention are to provide a lure which, upon being taken in the mouth of a fish, pull on the line will cause the weight member to be pulled outwardly of the body and shortening of the line leading to the hook will cause the rear end of the body to turn alongside the intermediate portion and the hook to reverse its position to engage the fish's mouth, and to provide a device of this character simple and economical to manufacture.

Other objects and advantages of this invention will become apparent from the following description taken in connection with the accompanying drawings wherein are set forth by way of illustration and example certain embodiments of this invention.

FIG. 1 is a perspective view of my invention showing the hook in normal position.

FIG. 2 is an elongated cross-sectional view showing the weight member in the forward portion of the body.

FIG. 3 is a perspective view showing lure in fish's mouth and the hook turned in fish engaging relation.

FIG. 4 is an enlarged fragmentary perspective view of the hook and its fastening cylinder to the body of the lure.

FIG. 5 is an enlarged fragmentary cross-sectional view showing a modified form of weight member movable in the forward portion of the body.

1 designates a fishing lure embodying the features of my invention including a body 2 of elongated elastic flexible and easily stretchable waterproof material. The body 2 comprises a forward portion 2' with a front end 3 and a rear portion 4 with a rear end 5 and an intermediate portion 6. The body is preferably molded with ring-like depressions 7 with an enlarged portion 8 to give the appearance of a natural worm.

The forward portion 2' is provided with a passageway opening 9 extending therethrough from the forward end 3 as illustrated in FIG. 2 to a reduced portion forming an opening 10 leading to the surface of the body for a purpose later described. Mounted on the rear portion 4 of the body 2 is a sleeve or cylindrical member 11 which may be of plastic, metal or the like, adapted for securing a hook member 12 to the body of the lure and which sleeve member is slidable on said body.

The hook member here described, comprised of shank members 13 and 14 bent to extend parallel to each other and forming an eye portion 15 and having the free ends turned as indicated at 16 and 17 forming points or hooks 18 and 19 normally extending rearwardly alongside the body 2 of the lure.

A line 20 is inserted through the passageway 9 having one end attached to a reel (not shown), as is the usual practice, and upon which a weight or lead member 21 is mounted and adapted to slide longitudinally in the passageway 9. The free end of the line is run through an opening 22 of a ball or anchor member 23 of plastic or like material, tied as indicated at 24 (FIG. 4). The ball is of greater diameter than the eye 15 to retain the line secured to the eye 15.

In operation of a lure constructed and assembled as described when a fish as indicated at 25 takes the lure in its mouth at about the position shown at 26 pull on the line 20 by winding of the reel (not shown) will cause the line to pull through the passageway 9 of the body 2 and thus cause the rear portion 4 to bend and turn so that a portion thereof will lie parallel with the intermediate portion 6 of the body 2 and the hook mechanism 12 will reverse its position so that the hook or points 18 and 19 will be turned forwardly alongside the body portion and further pull on the line will cause the hook to engage the fish's mouth so that it may be pulled from the water.

After removal of the lure from the fish's mouth, pull on the line at the portion indicated at 27 will cause the line and the weight thereon to reenter the passageway 9 and assume the normal position as shown in FIGS. 1 and 2 with the points of the hook mechanism extending rearwardly as it is normally intended to do. The passageway may be slightly larger in diameter than the line, but actually the material of the body is such that the passageway closes about the line and weight and frictionally engages the same.

In FIG. 5 I have illustrated a modified form of weight member which is shown to be elongated as indicated at 28 having eyes 29 and 30 on its respective ends. In this form a short line 31 is provided having one end attached to the eye 29 as indicated at 32 and its other end secured indirectly to the eye 15 of the hook mechanism as described in connection with the invention shown in FIGS. 1 through 4 inclusive. A line 33 leading from a reel (not shown) is tied to the eye 30 of the weight member as indicated at 34.

Operation of this form of invention is the same as in the first form of invention.

It will be obvious from the foregoing that I have provided a lure having a hook mechanism thereon which is normally facing rearwardly alongside the body and when pulled through the water will not engage on snags, weeds or the like and is sometimes referred to as a "weedless" hook and one which upon pull on the line will cause the hook to be reversed in position to engage the fish's mouth so that it may be pulled from the water. It will also be obvious that I have provided a lure in which a weight member may be embodied in the body of the lure and slidable in the forward portion thereof to eliminate the usual type of "sinker" attached to a line. Other means of slidably and functionally fastening the line to the forward portion of the body of the lure may be used, such as an elongated sleeve member acting as or replacing the usual weight embracing said portion and through which the line is run.

It is also to be understood that other materials than that I have described as a flexible and elastic body member may be utilized without departing from the spirit of my invention, such as a flexible joint for fastening of the hook mechanism thereto. It is to be further understood that although certain forms of the invention have been illustrated and described, it is not to be limited to the specific form or arrangement of parts herein described and shown except insofar as such limitations are included in the claims.

What I claim and desire to secure by Letters Patent is:

1. A fish lure comprising:
    (a) an elongated elastic, flexible and easily stretchable body, said body having forward and rear portions and an intermediate portion,
    (b) a hook member having a shank portion, an eye portion and a hook portion, said shank and eye portion being normally positioned rearwardly of the hook portion and said hook portion normally facing rearwardly of said body,
    (c) means on said rear portion of the body for securing said shank portion of the hook member to said body with said shank portion lying alongside rear portion of said body,
    (d) a line,
    (e) means slidably retaining said line to said forward portion of the body, and
    (f) means securing one end of the line to said eye portion of the hook member, whereby upon a fish taking said lure and simultaneous pull on said line, said line will slide with respect to the forward portion of said body causing said rear portion of the body to turn forwardly alongside said intermediate portion of said body thereby reversing the direction of said hook portion to hook the fish.

2. The lure as set forth in claim 1 wherein said first named means is a sleeve slidable on said rear portion of the body.

3. A fish lure comprising:
    (a) an elongated elastic, flexible and easily stretchable body, said body having forward and rear portions and an intermediate portion, the forward end of said forward portion being provided with an opening forming a longitudinal passageway through said forward portion,
    (b) a hook member having a shank portion, an eye portion and a hook portion, said shank and eye portion being normally positioned rearwardly of the hook portion and said hook portion normally facing rearwardly of said body,
    (c) means slidable on said rear portion of the body for securing said shank portion of the hook member to said body with said shank portion lying alongside said body,
    (d) a line extending through said passageway and extending externally of said intermediate portion of said body, and
    (e) means securing one end of the line to said eye portion of the hook member whereby, upon a fish taking said lure, simultaneous pull on said line will cause said line to slip through said passageway causing said rear portion of the body to turn forwardly alongside said intermediate portion of said body thereby reversing the direction of said hook portion to hook the fish.

4. A fish lure comprising:
    (a) an elongated elastic, flexible and easily stretchable body, said body having forward and rear portions and an intermediate portion, the forward end of said forward portion being provided with an opening forming a longitudinal passageway through said forward portion,
    (b) a hook member having a shank portion, an eye portion and a hook portion, said shank and eye portion being normally positioned rearwardly of the hook portion and said hook portion normally facing rearwardly of said body,
    (c) a sleeve member slidable on said rear portion of the body and engaging around said shank portion of the hook member for securing said shank portion to said body with said shank portion lying alongside said body,
    (d) a line extending through said passageway and extending externally of said intermediate portion of said body, and
    (e) means securing one end of the line to said eye portion of the hook member, whereby upon a fish taking said lure, and simultaneous pull on said line will cause said line to slip through said passageway causing said rear portion of the body to turn forwardly alongside said intermediate portion of said body thereby reversing the direction of said hook portion to hook the fish.

5. A fish lure comprising:
    (a) an elongated elastic, flexible and easily stretchable body, said body having forward and rear portions and an intermediate portion, the forward end of said forward portion being provided with an opening forming a longitudinal passageway through said forward portion,
    (b) a hook member having a shank portion, an eye portion and a hook portion, said shank and eye portion being normally positioned rearwardly of the hook portion and said hook portion normally facing rearwardly of said body,
    (c) means slidable on said rear portion of the body for securing said shank portion of the hook member to said body with said shank portion lying alongside said body,
    (d) a line extending through said passageway and extending externally of said intermediate portion of said body, and (e) a weight member on said line and slidable in said passageway, (f) means securing one end of the line to said eye portion of the hook member, whereby upon a fish taking said lure, and simultaneous pull on said line will cause said line to slip through said passageway causing said rear portion of the body to turn forwardly alongside said intermediate portion of said body thereby reversing the direction of said hook portion to hook the fish.

6. The lure set forth in claim 5 wherein said first named means is a sleeve slidable on said rear portion of the body.

References Cited in the file of this patent

UNITED STATES PATENTS

| | | |
|---|---|---|
| 2,912,784 | Carlin | Nov. 17, 1959 |
| 2,979,850 | Lund | Apr. 18, 1961 |